United States Patent
Lin et al.

(10) Patent No.: US 12,261,437 B1
(45) Date of Patent: Mar. 25, 2025

(54) MULTI-POWER SYSTEM FOR PROVIDING ELECTRICAL ENERGY AND METHOD IMPLEMENTED BY THE SAME

(71) Applicant: Automotive Research & Testing Center, Lugong (TW)

(72) Inventors: Po-Hsu Lin, Lugong (TW); Chien-An Chen, Lugong (TW); Yuan-Ching Yeh, Lugong (TW)

(73) Assignee: AUTOMOTIVE RESEARCH & TESTING CENTER, Lugong (TW)

( * ) Notice: Subject to any disclaimer, the term of this patent is extended or adjusted under 35 U.S.C. 154(b) by 0 days.

(21) Appl. No.: 18/543,019

(22) Filed: Dec. 18, 2023

(51) Int. Cl.
| | |
|---|---|
| H02J 3/00 | (2006.01) |
| B60L 50/75 | (2019.01) |
| H01M 10/44 | (2006.01) |
| H01M 10/46 | (2006.01) |
| H01M 16/00 | (2006.01) |
| H02J 3/32 | (2006.01) |
| H02J 3/46 | (2006.01) |
| H02J 7/00 | (2006.01) |
| H02J 7/34 | (2006.01) |

(52) U.S. Cl.
CPC ........... *H02J 3/0073* (2020.01); *H01M 10/44* (2013.01); *H01M 10/46* (2013.01); *H01M 16/006* (2013.01); *H02J 3/32* (2013.01); *H02J 3/46* (2013.01); *H02J 7/00032* (2020.01); *H02J 7/0048* (2020.01); *H02J 7/0068* (2013.01); *H02J 7/00712* (2020.01); *H02J 7/34* (2013.01); *B60L 50/75* (2019.02); *H02J 2300/30* (2020.01)

(58) Field of Classification Search
CPC .... H02J 3/0073; H02J 7/00032; H02J 7/0048; H02J 7/00712; H02J 3/32; H02J 3/46; H02J 7/0068; H02J 7/34; H02J 2300/30; H01M 10/44; H01M 10/46; H01M 16/006; B60L 50/75
See application file for complete search history.

(56) References Cited

U.S. PATENT DOCUMENTS

2024/0347818 A1 * 10/2024 Khalid .................... B60L 50/40

FOREIGN PATENT DOCUMENTS

| | | |
|---|---|---|
| CN | 105706284 A | 6/2016 |
| CN | 112467717 A | 3/2021 |
| TW | 201926847 A | 7/2019 |

* cited by examiner

*Primary Examiner* — Carlos Amaya
(74) *Attorney, Agent, or Firm* — Birch, Stewart, Kolasch & Birch, LLP

(57) ABSTRACT

A multi-power system for providing electrical energy includes a fuel cell unit, a lithium-ion cell unit, and a control unit. The control unit stores a power optimization data sheet that includes multiple power parameter sets, each including a first optimal power and a second optimal power. The control unit is configured to, when operating in a specific mode, select one of the power parameter sets as a selected set, control the fuel cell unit to operate at the first optimal power included in the selected set, control the lithium-ion cell unit to operate at the second optimal power included in the selected set, and control the fuel cell unit and the lithium-ion cell unit to cooperatively output electricity.

15 Claims, 3 Drawing Sheets

MULTI-POWER SYSTEM FOR PROVIDING ELECTRICAL ENERGY AND METHOD IMPLEMENTED BY THE SAME

FIELD

The disclosure relates to a multi-power system for providing electrical energy, and a method implemented by the same.

BACKGROUND

Conventionally, an electric vehicle is powered by a lithium-ion cell. However, the endurance of the electric vehicle is greatly limited by the size, the weight limits, and the charging time of the lithium-ion cell. Taiwanese Invention U.S. Pat. No. 1,645,649 proposed a multi-power supply distribution system and a method implemented by the same, which established an output power reference table for distributing the power usage by the multi-power supply distribution system so as to resolve problems such as charge level and charging time of the lithium-ion cell. However, the abovementioned method does not take countermeasures for circumstances where the power source is unstable into account.

SUMMARY

Therefore, an object of the disclosure is to provide a multi-power system and a method for a multi-power system to provide electrical energy, which can alleviate at least one of the drawbacks of the prior art.

According to the disclosure, the multi-power system for providing electrical energy to a load unit is provided to include a fuel cell unit, a lithium-ion cell unit, and a control unit. The fuel cell unit includes a fuel cell, and a first conversion module that is electrically connected to the fuel cell and that is to be electrically connected to the load unit. The lithium-ion cell unit includes a lithium-ion cell, and a second conversion module that is electrically connected to the lithium-ion cell and the first conversion module and that is to be electrically connected to the load unit. The control unit is electrically connected to the first conversion module and the second conversion module, and stores a power optimization data sheet that includes a plurality of power parameter sets. Each of the power parameter sets includes a power setting value, a first optimal power, and a second optimal power. The control unit is configured to switchably operate among a first mode, a second mode, a third mode, a fourth mode, and a fifth mode. The control unit is configured to, when operating in the first mode, control the first conversion module to draw electricity from the fuel cell at a maximum power and to output the electricity to the load unit and the second conversion module, and further control the second conversion module to output the electricity received from the first conversion module to the lithium-ion cell so as to charge the lithium-ion cell. The control unit is configured to, when operating in the second mode, control the first conversion module to draw electricity from the fuel cell at first predetermined power that is lower than the maximum power and to output the electricity to the load unit. The control unit is configured to, when operating in the third mode, control the first conversion module to draw electricity from the fuel cell at a predetermined low power, control the second conversion module to draw electricity from the lithium-ion cell at a second predetermined power, and control the first conversion module and the second conversion module to cooperatively output the electricity drawn from the fuel cell and the lithium-ion cell to the load unit. The control unit is configured to, when operating in the fourth mode, control the first conversion module, the second conversion module, and the load unit to stop operating. The control unit is configured to, when operating in the fifth mode, select one of the power parameter sets as a selected set, control the first conversion module to draw electricity from the fuel cell at the first optimal power included in the selected set, control the second conversion module to draw electricity from the lithium-ion cell at the second optimal power included in the selected set, and control the first conversion module and the second conversion module to cooperatively output the electricity drawn from the fuel cell and the lithium-ion cell to the load unit.

According to the disclosure, a method for a multi-power system to provide electrical energy includes steps of: A) generating a power optimization data sheet by a control unit, where the power optimization data sheet includes a plurality of power parameter sets, each of the power parameter sets including a power setting value, a first optimal power, and a second optimal power, the power optimization data sheet being generated by, for each of the power parameter sets, setting the power setting value, setting a plurality of fuel cell power values corresponding to a fuel cell, and a plurality of lithium-ion cell power values corresponding to a lithium-ion cell, defining a plurality of power combinations by pairing each one of the fuel cell power values with each one of the lithium-ion cell power values, obtaining an optimal power value combination that corresponds to the power setting value from the power combinations by performing calculations for each of the power combinations, and setting the fuel cell power value and the lithium-ion cell power value included in the optimal power value combination respectively as a first optimal power and a second optimal power that correspond to the power setting value; B) operating in a first mode by the control unit, where the first mode includes the control unit controlling a first conversion module that is electrically connected to the fuel cell to draw electricity from the fuel cell at a maximum power and to output the electricity to a load unit and a second conversion module that is electrically connected to the lithium-ion cell, and controlling the second conversion module to output the electricity received from the first conversion module to the lithium-ion cell so as to charge the lithium-ion cell; C) operating in a second mode by the control unit, where the second mode includes the control unit controlling the first conversion module to draw electricity from the fuel cell at a first predetermined power that is lower than the maximum power and to output the electricity to the load unit; D) operating in a third mode by the control unit, where the third mode includes the control unit controlling the first conversion module to draw electricity from the fuel cell at a predetermined low power, controlling the second conversion module to draw electricity from the lithium-ion cell at a second predetermined power, and controlling the first conversion module and the second conversion module to cooperatively output the electricity drawn from the fuel cell and the lithium-ion cell to the load unit; E) operating in a fourth mode by the control unit, where the fourth mode includes the control unit controlling the first conversion module, the second conversion module, and the load unit to stop operating; and F) operating in a fifth mode by the control unit, where the fifth mode includes the control unit selecting one of the power parameter sets as a selected set, controlling the first conversion module to draw electricity from the fuel cell at the first optimal power included in the selected set, controlling the second conversion module to draw electricity from the lithium-ion cell at the second optimal power included in the selected set, and controlling the first conversion module and the second conversion module to cooperatively output the electricity drawn from the fuel cell and the lithium-ion cell to the load unit.

BRIEF DESCRIPTION OF THE DRAWINGS

Other features and advantages of the disclosure will become apparent in the following detailed description of the embodiment(s) with reference to the accompanying drawings. It is noted that various features may not be drawn to scale.

DETAILED DESCRIPTION

Figure 1:
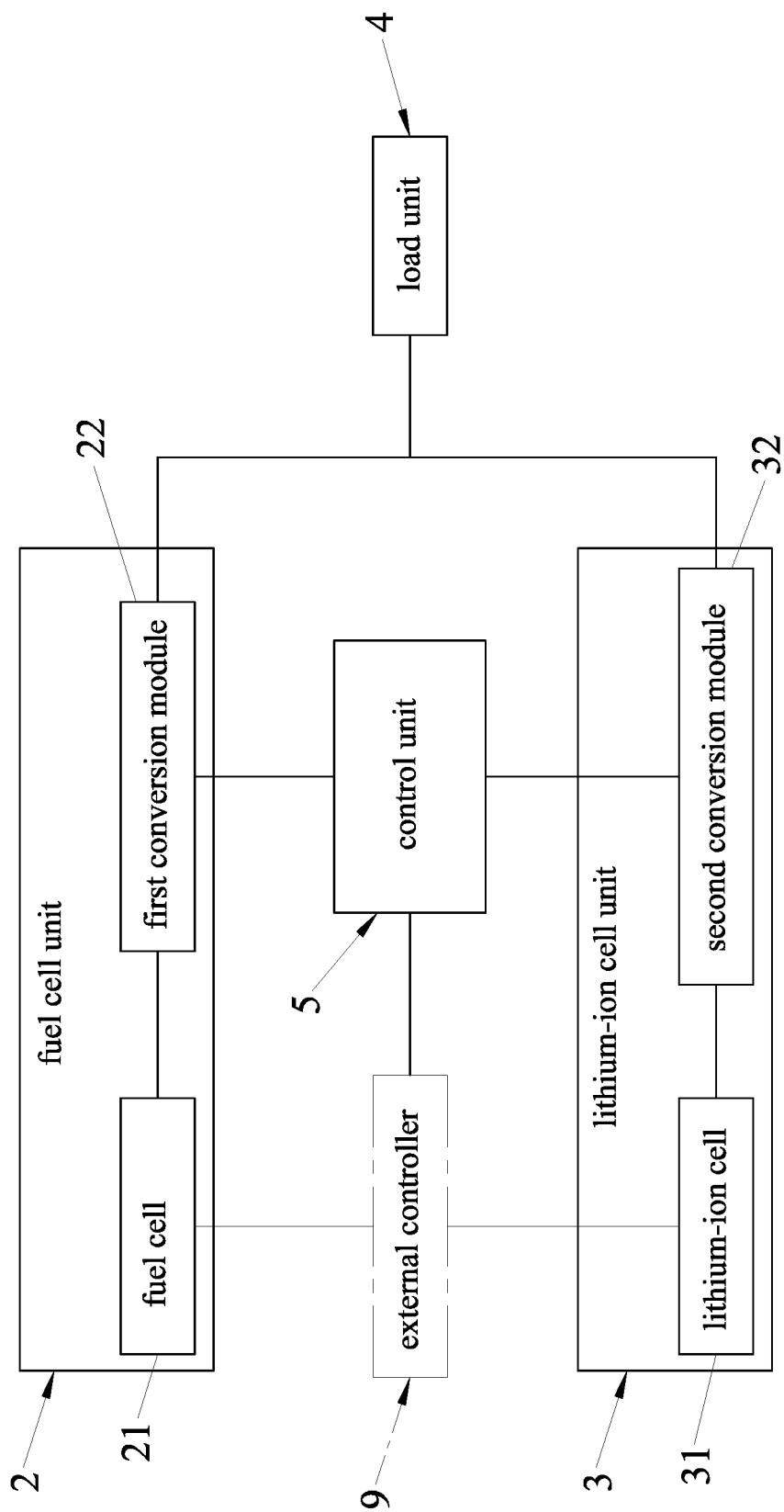
FIG. 1 is a block diagram illustrating a multi-power system according to an embodiment of the disclosure.

Before the disclosure is described in greater detail, it should be noted that where considered appropriate, reference numerals or terminal portions of reference numerals have been repeated among the figures to indicate corresponding or analogous elements, which may optionally have similar characteristics.

Referring to FIG. 1, according to an embodiment of the disclosure, a multi-power system includes a fuel cell unit 2, a lithium-ion cell unit 3, and a control unit 5, and is adapted for providing electrical energy to a load unit 4.

The fuel cell unit 2 includes a fuel cell 21, and a first conversion module 22 that is electrically connected to the fuel cell 21 and that is to be electrically connected to the load unit 4. In this embodiment, the first conversion module 22 is a power regulator that is configured to adjust an amount of power outputted by the fuel cell 21.

The lithium-ion cell unit 3 includes a lithium-ion cell 31, and a second conversion module 32 that is electrically connected to the lithium-ion cell 31 and the first conversion module 22 and that is to be electrically connected to the load unit 4. In this embodiment, the second conversion module 32 is another power regulator that is configured to adjust an amount of power outputted by the lithium-ion cell 31.

The load unit 4 receives electricity from the first conversion module 22 and the second conversion module 32. In this embodiment, the load unit 4 is an electrical load system of a vehicle (not shown).

The control unit 5 is electrically connected to an external controller 9, the first conversion module 22, and the second conversion module 32. In this embodiment, the external controller 9 may be a complete vehicle control system of the vehicle, and is electrically connected to the fuel cell 21 and the lithium-ion cell 31 so as to monitor operation of the fuel cell 21 and the lithium-ion cell 31 in real time.

The control unit 5 is configured to perform an optimization procedure so as to generate a power optimization data sheet. The power optimization data sheet includes a plurality of power parameter sets, each including a power setting value, a first optimal power, and a second optimal power.

Figure 2:
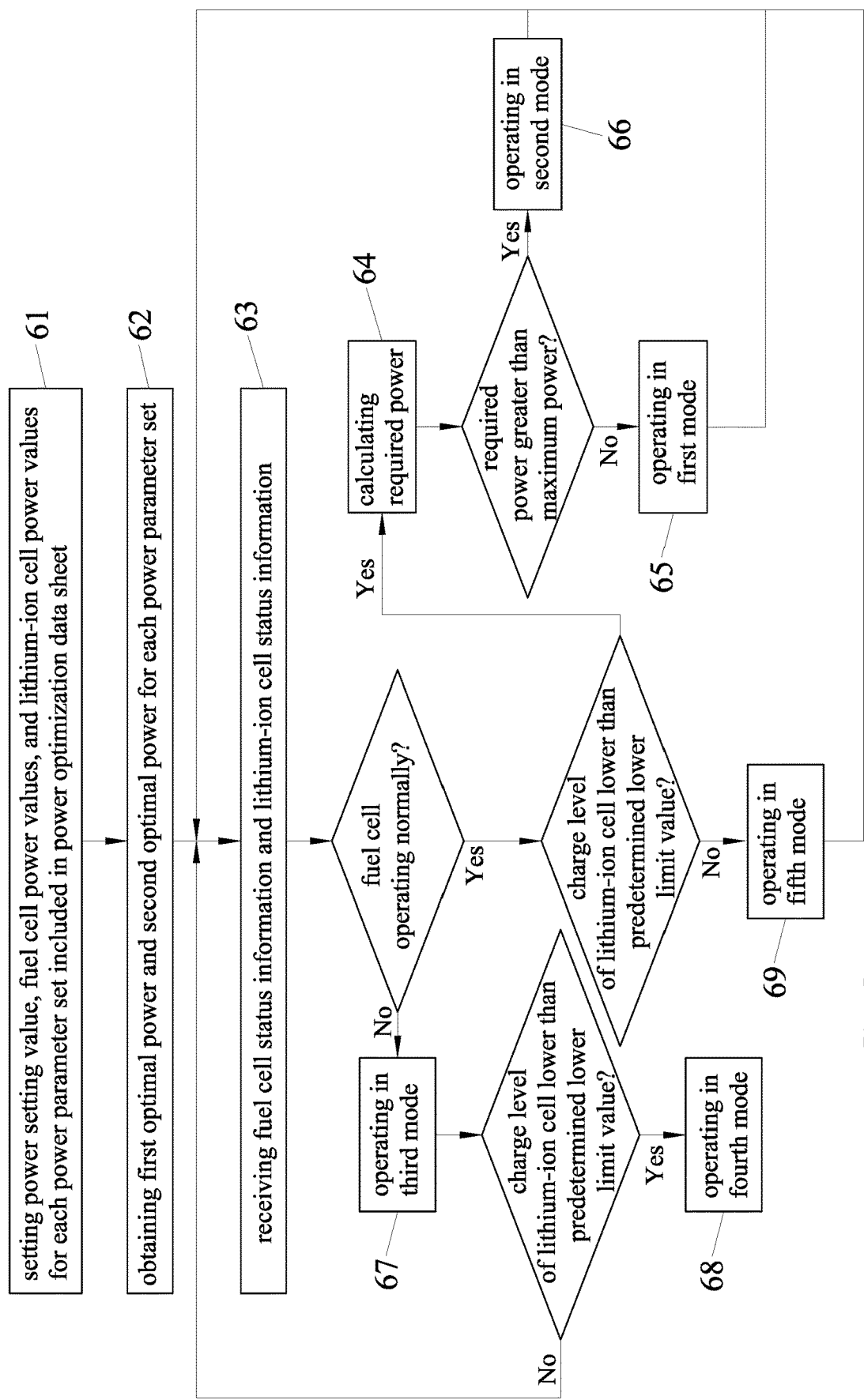
FIG. 2 is a flow chart illustrating a method for providing electrical energy implemented by the multi-power system according to an embodiment of the disclosure.
Figure 3:
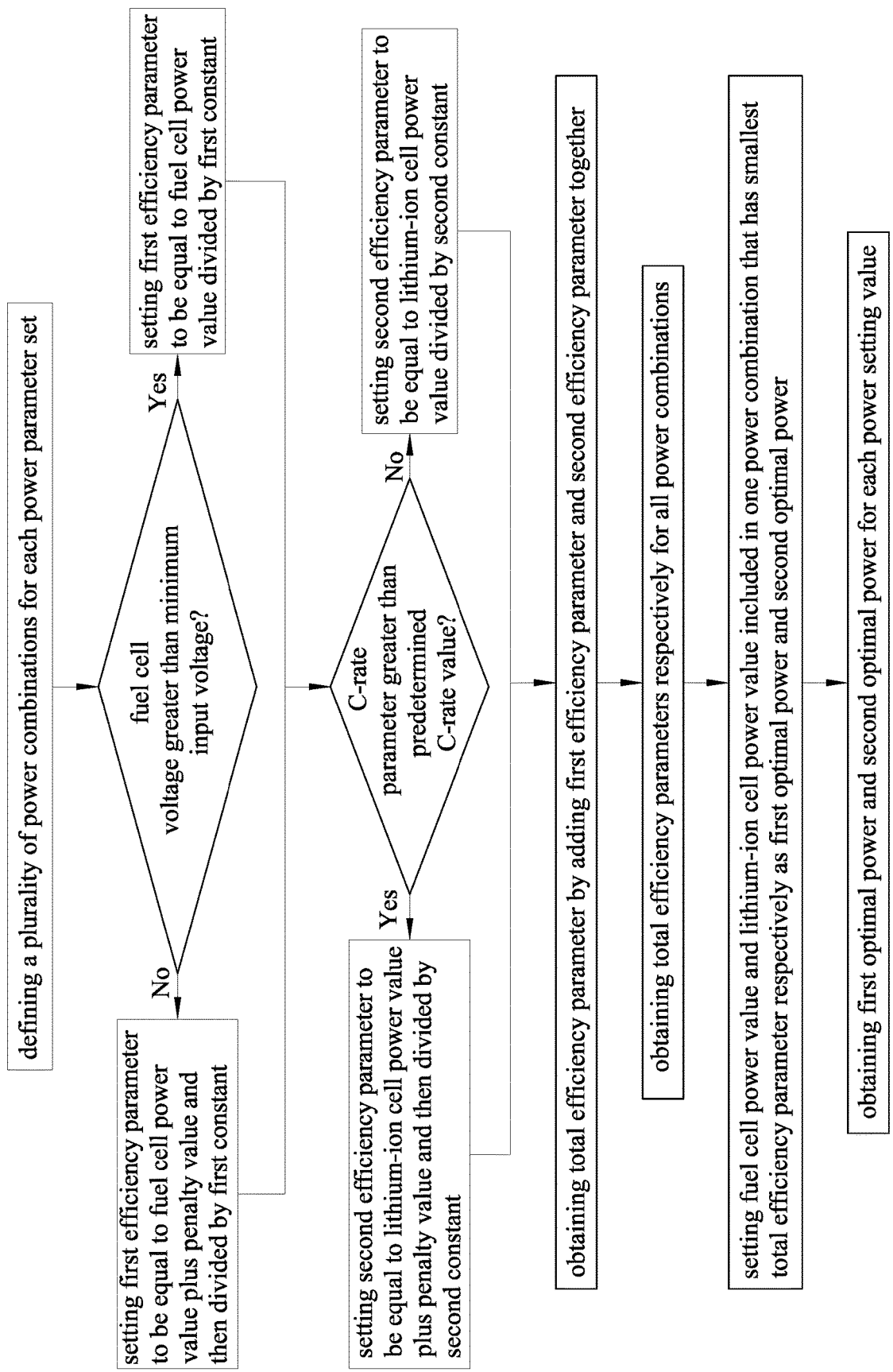
FIG. 3 is a flow chart illustrating an optimization procedure for generating a power optimization data sheet according to an embodiment of the disclosure.

Further referring to FIGS. 2 and 3, during the optimization procedure, the control unit 5 sets, for each of the power parameter sets, the power setting value based on either a user input or an operating power range of the load unit 4, a plurality of fuel cell power values that correspond to the fuel cell 21 based on an output power range of the fuel cell 21, and a plurality of lithium-ion cell power values that correspond to the lithium-ion cell 31 based on an output power range of the lithium-ion cell 31.

To describe in further detail, the power setting values respectively of the power parameter sets are denoted by [Pdm_1 Pdm_2 Pdm_3 . . . . Pdm_n], where 'n' equals to a quantity of the power setting values. In one example, the power setting values are set from 0 kW to 100 kW with 5 kW increments (e.g., [Pdm_1 Pdm_2 Pdm_3 . . . . Pdm_n]=[5 kW 10 kW 15 kW . . . 100 kW]). The fuel cell power values set for each of the power setting values are denoted by [Pfc_1 Pfc_2 Pfc_3 . . . . Pfc_m], where 'm' equals to a quantity of the fuel cell power values. The lithium-ion cell power values set for each of the power setting values are denoted by [Pbatt_1 Pbatt_2 Pbatt_3 . . . . Pbatt_k], where 'k' equals to a quantity of the lithium-ion cell power values.

The control unit 5 then defines, for each of the power parameter sets, a plurality of power combinations by pairing each one of the fuel cell power values with each one of the lithium-ion cell power values. In one example, one of the power combinations may be pairing the fuel cell power value [Pfc_1] with the lithium-ion cell power value [Pbatt_3], and another one of the power combinations may be pairing the fuel cell power value [Pfc_m] with the lithium-ion cell power value [Pbatt_k].

For each of the power parameter sets, the control unit 5 obtains an optimal power value combination that corresponds to the power setting value and that is from the power combinations by performing calculations for each of the power combinations, and makes the fuel cell power value and the lithium-ion cell power value included in the optimal power value combination respectively serve as the first optimal power and the second optimal power that correspond to the power setting value (i.e., the first optimal power and the second optimal power are respectively set to the values of the fuel cell power value and the lithium-ion cell power value).

It should be noted that the numbering of "first" and "second" respectively of the first optimal power and the second optimal power does not necessarily imply that "first" is more optimal than "second". The numbering simply indicates that the first optimal power and the second optimal power respectively correspond to the fuel cell 21 and the lithium-ion cell 31.

For each of the power parameter sets, when the control unit 5 is obtaining the optimal power value combination that corresponds to the power setting value, the control unit 5 first obtains, for each of the power combinations that corresponds to the power setting value, a first efficiency parameter by performing calculation based on the fuel cell power value included in the power combination, and a second efficiency parameter by performing calculation based on the lithium-ion cell power value included in the power combination. The control unit 5 then obtains a total efficiency parameter for the power combination by adding the first efficiency parameter and the second efficiency parameter together. After the control unit 5 has obtained the total efficiency parameters respectively for the power combinations that correspond to the power setting value, the control unit 5 makes the fuel cell power value and the lithium-ion cell power value included in one of the power combinations respectively serve as the first optimal power and the second optimal power that correspond to the power setting value, where the one of the power combinations has a smallest total efficiency parameter among the total efficiency parameters.

When the control unit 5 is obtaining the first efficiency parameter for each of the power combinations, the control unit 5 first determines, based on a fuel cell parameter sheet pre-stored therein, whether a fuel cell voltage that corresponds to the fuel cell power value included in the power combination is greater than a minimum input voltage. When determining that the fuel cell voltage is greater than the minimum input voltage, the control unit 5 sets the first efficiency parameter to be equal to the fuel cell power value divided by a first constant; on the contrary, when determining that the fuel cell voltage is not greater than the minimum input voltage, the control unit 5 sets the first efficiency parameter to be equal to the fuel cell power value plus a penalty value and then divided by the first constant.

To describe in further detail, the fuel cell parameter sheet pre-stored in the control unit 5 is a characteristic table of the fuel cell 21, and includes data regarding output voltages of the fuel cell 21 that respectively correspond to different power usage of the fuel cell 21. The minimum input voltage is a lower limit voltage of the first conversion module 22. When the fuel cell voltage that corresponds to the fuel cell power value is lower than the minimum input voltage, the fuel cell power value is considered inappropriate, and thus the penalty value is added during calculation of the first efficiency parameter to significantly increase the first efficiency parameter, which prevents the corresponding total efficiency parameter from being the smallest total efficiency parameter among the total efficiency parameters. In this embodiment, the first constant for calculating the first efficiency parameter is a battery efficiency of the fuel cell 21. The penalty value may be any large number (e.g., infinity) that is able to prevent the total efficiency parameter with the penalty value added from being the smallest total efficiency parameter among the total efficiency parameters.

When the control unit 5 is obtaining the second efficiency parameter for each of the power combinations, the control unit 5 first determines, based on a lithium-ion cell parameter sheet pre-stored therein, whether a charge/discharge rate (C-rate) parameter is greater than a predetermined C-rate value, where the C-rate parameter is obtained as a discharge current parameter that corresponds to the lithium-ion cell power value included in the power combination divided by a capacity of the lithium-ion cell 31. When determining that the C-rate parameter is not greater than the predetermined C-rate value, the control unit 5 sets the second efficiency parameter to be equal to the lithium-ion cell power value divided by a second constant; on the contrary, when determining that the C-rate parameter is greater than the predetermined C-rate value, the control unit 5 sets the second efficiency parameter to be equal to the lithium-ion cell power value plus the penalty value and then divided by the second constant.

To describe in further detail, the lithium-ion cell parameter sheet pre-stored in the control unit 5 is a characteristic table of the lithium-ion cell 31, and includes data regarding the discharge current parameters that respectively correspond to different lithium-ion cell power values, and the capacity of the lithium-ion cell 31, where the discharge current parameters are obtained by the lithium-ion cell power values divided by a standard voltage of the lithium-ion cell 31. When the C-rate parameter obtained based on the lithium-ion cell power value is greater than the predetermined C-rate value, the lithium-ion cell 31 that operates using such C-rate parameter may be damaged from being over discharged, and the lithium-ion cell power value is considered inappropriate, and thus the penalty value is added during calculation of the second efficiency parameter to significantly increase the second efficiency parameter, which prevents the corresponding total efficiency parameter from being the smallest total efficiency parameter among the total efficiency parameters. In this embodiment, the second constant for calculating the second efficiency parameter is a battery efficiency of the lithium-ion cell 31, and the predetermined C-rate value is 0.8, but the disclosure is not limited to such.

The control unit 5 is configured to switchably operate among a first mode, a second mode, a third mode, a fourth mode, and a fifth mode.

When the control unit 5 is operating in the first mode, the control unit 5 controls the first conversion module 22 to draw electricity from the fuel cell 21 at a maximum power and to output the electricity to the load unit 4 and the second conversion module 32. The control unit 5 further controls the second conversion module 32 to output the electricity received from the first conversion module 22 to the lithium-ion cell 31 so as to charge the lithium-ion cell 31. In this embodiment, the maximum power is an upper limit of power at which the first conversion module 22 is able to operate to draw electricity from the fuel cell 21, but the disclosure is not limited to such.

When the control unit 5 is operating in the second mode, the control unit 5 controls the first conversion module 22 to draw electricity from the fuel cell 21 at a first predetermined power that is lower than the maximum power and to output the electricity to the load unit 4.

When the control unit 5 is operating in the third mode, the control unit 5 controls the first conversion module 22 to draw electricity from the fuel cell 21 at a predetermined low power, controls the second conversion module 32 to draw electricity from the lithium-ion cell 31 at a second predetermined power, and controls the first conversion module 22 and the second conversion module 32 to cooperatively output the electricity drawn from the fuel cell 21 and the lithium-ion cell 31 to the load unit 4. In this embodiment, the predetermined low power is a lower limit of power or a minimum power at which the first conversion module 22 is able to operate to draw electricity from the fuel cell 21, and the second predetermined power is within an operating power range of the lithium-ion cell 31, but the disclosure is not limited to such.

When the control unit 5 is operating in the fourth mode, the control unit 5 controls the first conversion module 22, the second conversion module 32, and the load unit 4 to stop operating.

When the control unit 5 is operating in the fifth mode, the control unit 5 selects one of the power parameter sets included in the power optimization data sheet as a selected set. The control unit 5 further controls the first conversion module 22 to draw electricity from the fuel cell 21 at the first optimal power included in the selected set, controls the second conversion module 32 to draw electricity from the lithium-ion cell 31 at the second optimal power included in the selected set, and controls the first conversion module 22 and the second conversion module 32 to cooperatively output the electricity drawn from the fuel cell 21 and the lithium-ion cell 31 to the load unit 4. In this embodiment, the external controller 9 calculates a target power related to the vehicle by determining a current driving demand of the vehicle, and sends the target power to the control unit 5. The control unit 5 then selects one of the power parameter sets that has the power setting value corresponding to the target power as the selected set. Since a method for calculating the target power related to the vehicle is not the emphasis of this disclosure, it will not be described in further detail for the sake of brevity.

Referring to FIGS. 1 and 2, a method for providing electrical energy implemented by the control unit 5 of the multi-power system includes steps 61 to 69, where steps 61 and 62 constitute the abovementioned optimization procedure.

In step 61, the control unit 5 establishes the power optimization data sheet, and, for each of the power parameter sets included in the power optimization data sheet, sets the power setting value, and establishes the fuel cell power values and the lithium-ion cell power values that correspond to the power setting value.

In step 62, the control unit 5 obtains, for each of the power parameter sets, the optimal power value combination that corresponds to the power setting value from the power combinations by performing calculations for each of the power combinations, and makes the fuel cell power value and the lithium-ion cell power value included in the optimal power value combination respectively serve as the first optimal power and the second optimal power that correspond to the power setting value.

In step 63, the control unit 5 receives fuel cell status information outputted from the fuel cell 21, and receives lithium-ion cell status information outputted from the lithium-ion cell 31. In this embodiment, the fuel cell status information and the lithium-ion cell status information are obtained and sent by the external controller 9 to the control unit 5.

In step 64, which is executed when the fuel cell status information indicates that the fuel cell 21 is operating normally (e.g., a voltage of the fuel cell 21 is not lower than a predetermined voltage threshold) and when the lithium-ion cell status information indicates that a charge level of the lithium-ion cell 31 is lower than a predetermined lower limit value, the control unit 5 calculates a required power that is to be compensated by the first conversion module 22 to the load unit 4.

In step 65, which is executed when the required power is not greater than the maximum power, the control unit 5 operates in the first mode.

In step 66, which is executed when the required power is greater than the maximum power, the control unit 5 operates in the second mode.

In step 67, which is executed when the fuel cell status information indicates that the fuel cell 21 is operating abnormally (e.g., the voltage of the fuel cell 21 is lower than the predetermined voltage threshold), the control unit 5 operates in the third mode.

In step 68, which is executed when the control unit 5 is operating in the third mode and when the lithium-ion cell status information indicates that the charge level of the lithium-ion cell 31 is lower than the predetermined lower limit value, the control unit 5 operates in the fourth mode.

In step 69, which is executed when the fuel cell status information indicates that the fuel cell 21 is operating normally and when the lithium-ion cell status information indicates that the charge level of the lithium-ion cell 31 is not lower than the predetermined lower limit value, the control unit 5 operates in the fifth mode.

When the control unit 5 is operating in the fifth mode, since the first optimal power and the second optimal power are obtained from the smallest one of the total efficiency parameters that correspond to the power setting value (i.e., the target power), the fuel cell 21 and the lithium-ion cell 31 may cooperatively operate under minimum energy consumption, thus conserving energy. By adding the penalty value to the calculation of the first efficiency parameter and the second efficiency parameter, the power combinations that are inappropriate may be eliminated so as to avoid causing damage to the fuel cell 21 and the lithium-ion cell 31 and to extend service life of the fuel cell 21 and the lithium-ion cell 31.

Furthermore, when the fuel cell 21 is operating normally, when the charge level of the lithium-ion cell 31 is insufficient (i.e., lower than the predetermined lower limit value), and when the required power is not greater than the maximum power at which the first conversion module 22 is able to draw electricity from the fuel cell 21, the control unit 5 may operate in the first mode so that the fuel cell 21 provides electricity to the load unit 4 and the lithium-ion cell 31, thereby allowing the load unit 4 to operate normally (e.g., operating at the required power) and to simultaneously charge the lithium-ion cell 31.

When the fuel cell 21 is operating normally, when the charge level of the lithium-ion cell 31 is insufficient, and when the required power is greater than the maximum power at which the first conversion module 22 is able to draw electricity from the fuel cell 21, the control unit 5 may operate in the second mode so that the fuel cell 21 only provides electricity to the load unit 4, thereby maintaining operation of the load unit 4 (e.g., the load unit 4 operating under minimum power consumption).

When the fuel cell 21 is operating abnormally, and when the charge level of the lithium-ion cell 31 is sufficient (i.e., not lower than the predetermined lower limit value), the control unit 5 may operate in the third mode so that the lithium-ion cell 31 provides electricity to the load unit 4 at the second predetermined power, and the fuel cell 21 provides electricity to the load unit 4 at the predetermined low power, thereby maintaining the minimum operation of the load unit 4.

When the fuel cell 21 is operating abnormally, and when the charge level of the lithium-ion cell 31 is insufficient, the control unit 5 may operate in the fourth mode so that the fuel cell 21, the lithium-ion cell 31, and the load unit 4 stop operating for safety concern.

In summary, according to the disclosure, the multi-power system is capable of operating in different modes under different circumstances, which makes power allocation more flexible. Furthermore, when the control unit 5 is operating in the fifth mode, the control unit 5 controls the fuel cell 21 and the lithium-ion cell 31 to operate at optimal efficiency (i.e., the first optimal power and the second optimal power) based on the power optimization data sheet.

In the description above, for the purposes of explanation, numerous specific details have been set forth in order to provide a thorough understanding of the embodiment(s). It will be apparent, however, to one skilled in the art, that one or more other embodiments may be practiced without some of these specific details. It should also be appreciated that reference throughout this specification to "one embodiment," "an embodiment," an embodiment with an indication of an ordinal number and so forth means that a particular feature, structure, or characteristic may be included in the practice of the disclosure. It should be further appreciated that in the description, various features are sometimes grouped together in a single embodiment, figure, or description thereof for the purpose of streamlining the disclosure and aiding in the understanding of various inventive aspects; such does not mean that every one of these features needs to be practiced with the presence of all the other features. In other words, in any described embodiment, when implementation of one or more features or specific details does not affect implementation of another one or more features or specific details, said one or more features may be singled out and practiced alone without said another one or more features or specific details. It should be further noted that one or more features or specific details from one embodiment may be practiced together with one or more features or specific details from another embodiment, where appropriate, in the practice of the disclosure.

While the disclosure has been described in connection with what is (are) considered the exemplary embodiment(s), it is understood that this disclosure is not limited to the disclosed embodiment(s) but is intended to cover various arrangements included within the spirit and scope of the broadest interpretation so as to encompass all such modifications and equivalent arrangements.

What is claimed is:

1. A multi-power system for providing electrical energy to a load unit, said multi-power system comprising:
    a fuel cell unit including a fuel cell, and a first conversion module that is electrically connected to said fuel cell and that is to be electrically connected to the load unit;
    a lithium-ion cell unit including a lithium-ion cell, and a second conversion module that is electrically connected to said lithium-ion cell and said first conversion module and that is to be electrically connected to the load unit; and
    a control unit electrically connected to said first conversion module and said second conversion module, and storing a power optimization data sheet that includes a plurality of power parameter sets, each of the power parameter sets including a power setting value, a first optimal power, and a second optimal power, said control unit being configured to switchably operate among a first mode, a second mode, a third mode, a fourth mode, and a fifth mode, wherein said control unit is configured to,
    when operating in the first mode, control said first conversion module to draw electricity from said fuel cell at a maximum power and to output the electricity to the load unit and said second conversion module, and further control said second conversion module to output the electricity received from said first conversion module to said lithium-ion cell so as to charge said lithium-ion cell,
    when operating in the second mode, control said first conversion module to draw electricity from said fuel cell at a first predetermined power that is lower than the maximum power and to output the electricity to the load unit,
    when operating in the third mode, control said first conversion module to draw electricity from said fuel cell at a predetermined low power, control said second conversion module to draw electricity from said lithium-ion cell at a second predetermined power, and control said first conversion module and said second conversion module to cooperatively output the electricity drawn from said fuel cell and said lithium-ion cell to the load unit,
    when operating in the fourth mode, control said first conversion module, said second conversion module, and the load unit to stop operating, and
    when operating in the fifth mode, select one of the power parameter sets as a selected set, control said first conversion module to draw electricity from said fuel cell at the first optimal power included in the selected set, control said second conversion module to draw electricity from said lithium-ion cell at the second optimal power included in the selected set, and control said first conversion module and said second conversion module to cooperatively output the electricity drawn from said fuel cell and said lithium-ion cell to the load unit.

2. The multi-power system as claimed in claim 1, wherein said control unit is configured to perform an optimization procedure so as to generate the power optimization data sheet by, for each of the power parameter sets:
    setting the power setting value;
    setting a plurality of fuel cell power values corresponding to said fuel cell, and a plurality of lithium-ion cell power values corresponding to said lithium-ion cell;
    defining a plurality of power combinations by pairing each one of the fuel cell power values with each one of the lithium-ion cell power values;
    obtaining an optimal power value combination that corresponds to the power setting value from the power combinations by performing calculations for each of the power combinations; and
    setting the fuel cell power value and the lithium-ion cell power value included in the optimal power value combination respectively as the first optimal power and the second optimal power that correspond to the power setting value.

3. The multi-power system as claimed in claim 2, wherein said control unit is configured to obtain, for each of the power parameter sets, the optimal power value combination that corresponds to the power setting value by,
    for each of the power combinations that corresponds to the power setting value,
        obtaining a first efficiency parameter by performing calculation based on the fuel cell power value included in the power combination,
        obtaining a second efficiency parameter by performing calculation based on the lithium-ion cell power value included in the power combination, and
        obtaining a total efficiency parameter by adding the first efficiency parameter and the second efficiency parameter together;
    and further by, after obtaining the total efficiency parameters respectively for the power combinations that correspond to the power setting value, setting the fuel cell power value and the lithium-ion cell power value included in one of the power combinations respectively as the first optimal power and the second optimal power that correspond to the power setting value, where the one of the power combinations has a smallest total efficiency parameter among the total efficiency parameters.

4. The multi-power system as claimed in claim 3, wherein said control unit is configured to obtain the first efficiency parameter for each of the power combinations by
    determining, based on a fuel cell parameter sheet prestored in said control unit, whether a fuel cell voltage that corresponds to the fuel cell power value included in the power combination is greater than a minimum input voltage of said first conversion module,
    when determining that the fuel cell voltage is greater than the minimum input voltage, setting the first efficiency parameter to be equal to the fuel cell power value divided by a first constant, and
    when determining that the fuel cell voltage is not greater than the minimum input voltage, setting the first efficiency parameter to be equal to the fuel cell power value plus a penalty value and then divided by the first constant.

5. The multi-power system as claimed in claim 4, wherein said control unit is configured to obtain the second efficiency parameter for each of the power combinations by
determining, based on a lithium-ion cell parameter sheet pre-stored in said control unit, whether a C-rate parameter is greater than a predetermined C-rate value, where the C-rate parameter is obtained as a discharge current parameter that corresponds to the lithium-ion cell power value included in the power combination divided by a capacity of the lithium-ion cell,
when determining that the C-rate parameter is not greater than the predetermined C-rate value, setting the second efficiency parameter to be equal to the lithium-ion cell power value divided by a second constant, and
when determining that the C-rate parameter is greater than the predetermined C-rate value, setting the second efficiency parameter to be equal to the lithium-ion cell power value plus the penalty value and then divided by the second constant.

6. The multi-power system as claimed in claim 1, wherein said control unit is configured to
receive fuel cell status information outputted by said fuel cell,
receive lithium-ion cell status information outputted by said lithium-ion cell,
calculate a required power to be compensated by said first conversion module to the load unit when the fuel cell status information indicates that said fuel cell is operating normally, and when the lithium-ion cell status information indicates that a charge level of said lithium-ion cell is lower than a predetermined lower limit value,
operate in the first mode when the required power is not greater than the maximum power, and
operate in the second mode when the required power is greater than the maximum power.

7. The multi-power system as claimed in claim 1, wherein said control unit is configured to
receive fuel cell status information outputted by said fuel cell,
receive lithium-ion cell status information outputted by said lithium-ion cell,
operate in the third mode when the fuel cell status information indicates that said fuel cell is operating abnormally, and
operate in the fourth mode after operating in the third mode and when the lithium-ion cell status information indicates that a charge level of said lithium-ion cell is lower than a predetermined lower limit value.

8. The multi-power system as claimed in claim 1, wherein said control unit is configured to
receive fuel cell status information from said fuel cell,
receive lithium-ion cell status information from said lithium-ion cell, and
operate in the fifth mode when the fuel cell status information indicates that said fuel cell is operating normally, and when the lithium-ion cell status information indicates that a charge level of said lithium-ion cell is not lower than a predetermined lower limit value.

9. A method for a multi-power system to provide electrical energy comprising:
A) generating a power optimization data sheet by a control unit, where the power optimization data sheet includes a plurality of power parameter sets, each of the power parameter sets including a power setting value, a first optimal power, and a second optimal power, the power optimization data sheet being generated by, for each of the power parameter sets,
setting the power setting value,
setting a plurality of fuel cell power values corresponding to a fuel cell, and a plurality of lithium-ion cell power values corresponding to a lithium-ion cell,
defining a plurality of power combinations by pairing each one of the fuel cell power values with each one of the lithium-ion cell power values,
obtaining an optimal power value combination that corresponds to the power setting value from the power combinations by performing calculations for each of the power combinations, and
setting the fuel cell power value and the lithium-ion cell power value included in the optimal power value combination respectively as a first optimal power and a second optimal power that correspond to the power setting value;
B) operating in a first mode by the control unit, where the first mode includes the control unit controlling a first conversion module that is electrically connected to the fuel cell to draw electricity from the fuel cell at a maximum power and to output the electricity to a load unit and a second conversion module that is electrically connected to the lithium-ion cell, and controlling the second conversion module to output the electricity received from the first conversion module to the lithium-ion cell so as to charge the lithium-ion cell;
C) operating in a second mode by the control unit, where the second mode includes the control unit controlling the first conversion module to draw electricity from the fuel cell at a first predetermined power that is lower than the maximum power and to output the electricity to the load unit;
D) operating in a third mode by the control unit, where the third mode includes the control unit controlling the first conversion module to draw electricity from the fuel cell at a predetermined low power, controlling the second conversion module to draw electricity from the lithium-ion cell at a second predetermined power, and controlling the first conversion module and the second conversion module to cooperatively output the electricity drawn from the fuel cell and the lithium-ion cell to the load unit;
E) operating in a fourth mode by the control unit, where the fourth mode includes the control unit controlling the first conversion module, the second conversion module, and the load unit to stop operating; and
F) operating in a fifth mode by the control unit, where the fifth mode includes the control unit selecting one of the power parameter sets as a selected set, controlling the first conversion module to draw electricity from the fuel cell at the first optimal power included in the selected set, controlling the second conversion module to draw electricity from the lithium-ion cell at the second optimal power included in the selected set, and controlling the first conversion module and the second conversion module to cooperatively output the electricity drawn from the fuel cell and the lithium-ion cell to the load unit.

10. The method as claimed in claim 9, wherein
the step of obtaining an optimal power value combination that corresponds to the power setting value includes sub-steps of, for each of the power combinations that corresponds to the power setting value, obtaining a first efficiency parameter by performing calculation based on the fuel cell power value included in the power combination, obtaining a second efficiency parameter by performing calculation based on the lithium-ion cell power value included in the power combination, and obtaining a total efficiency parameter by adding the first efficiency parameter and the second efficiency parameter together, and further includes a sub-step of, after obtaining the total efficiency parameters respectively for the power combinations that correspond to the power setting value, setting the fuel cell power value and the lithium-ion cell power value included in one of the power combinations respectively as the first optimal power and the second optimal power that correspond to the power setting value, where the one of the power combinations has a smallest total efficiency parameter among the total efficiency parameters.

11. The method as claimed in claim 10, wherein the step of obtaining a first efficiency parameter includes sub-steps of, for each of the power combinations, determining, based on a fuel cell parameter sheet pre-stored in the control unit, whether a fuel cell voltage that corresponds to the fuel cell power value included in the power combination is greater than a minimum input voltage of the first conversion module, when determining that the fuel cell voltage is greater than the minimum input voltage, setting the first efficiency parameter to be equal to the fuel cell power value divided by a first constant, and when determining that the fuel cell voltage is not greater than the minimum input voltage, setting the first efficiency parameter to be equal to the fuel cell power value plus a penalty value and then divided by the first constant.

12. The method as claimed in claim 11, wherein the step of obtaining a second efficiency parameter includes sub-steps of, for each of the power combinations, determining, based on a lithium-ion cell parameter sheet pre-stored in the control unit, whether a C-rate parameter is greater than a predetermined C-rate value, where the C-rate parameter is obtained as a discharge current parameter that corresponds to the lithium-ion cell power value included in the power combination divided by a capacity of the lithium-ion cell, when determining that the C-rate parameter is not greater than the predetermined C-rate value, setting the second efficiency parameter to be equal to the lithium-ion cell power value divided by a second constant, and when determining that the C-rate parameter is greater than the predetermined C-rate value, setting the second efficiency parameter to be equal to the lithium-ion cell power value plus the penalty value and then divided by the second constant.

13. The method as claimed in claim 9, further comprising:

G) the control unit receiving fuel cell status information outputted by the fuel cell, and receiving lithium-ion cell status information outputted by the lithium-ion cell; and H) the control unit calculating a required power to be compensated by the first conversion module to the load unit when the fuel cell status information indicates that the fuel cell is operating normally, and when the lithium-ion cell status information indicates that a charge level of the lithium-ion cell is lower than a predetermined lower limit value, the control unit performing step B) when the required power is not greater than the maximum power, and the control unit performing step C) when the required power is greater than the maximum power.

14. The method as claimed in claim 9, further comprising:

G) the control unit receiving fuel cell status information outputted by the fuel cell, receiving lithium-ion cell status information outputted by the lithium-ion cell, performing step D) when the fuel cell status information indicates that the fuel cell operates abnormally, and performing step E) after operating in the third mode and when the lithium-ion cell status information indicates that a charge level of the lithium-ion cell is lower than a predetermined lower limit value.

15. The method as claimed in claim 9, further comprising:

G) the control unit receiving fuel cell status information outputted by the fuel cell, receiving lithium-ion cell status information outputted by the lithium-ion cell, and performing step F) when the fuel cell status information indicates that the fuel cell is operating normally, and when the lithium-ion cell status information indicates that a charge level of the lithium-ion cell is not lower than a predetermined lower limit value.

* * * * *